United States Patent
Kenkare et al.

(10) Patent No.: US 7,870,400 B2
(45) Date of Patent: Jan. 11, 2011

(54) SYSTEM HAVING A MEMORY VOLTAGE CONTROLLER WHICH VARIES AN OPERATING VOLTAGE OF A MEMORY AND METHOD THEREFOR

(75) Inventors: Prashant U. Kenkare, Austin, TX (US); William C. Moyer, Dripping Springs, TX (US)

(73) Assignee: Freescale Semiconductor, Inc., Austin, TX (US)

(*) Notice: Subject to any disclaimer, the term of this patent is extended or adjusted under 35 U.S.C. 154(b) by 706 days.

(21) Appl. No.: 11/619,070

(22) Filed: Jan. 2, 2007

(65) Prior Publication Data

US 2008/0162951 A1  Jul. 3, 2008

(51) Int. Cl.
*G06F 1/00* (2006.01)
(52) U.S. Cl. ...................................... 713/300
(58) Field of Classification Search ........... 713/300
See application file for complete search history.

(56) References Cited

U.S. PATENT DOCUMENTS

| | | | | |
|---|---|---|---|---|
| 5,970,069 A | * | 10/1999 | Kumar et al. | 370/402 |
| 6,012,109 A | * | 1/2000 | Schultz | 710/56 |
| 6,221,012 B1 | * | 4/2001 | Maschke et al. | 600/301 |
| 6,598,097 B1 | * | 7/2003 | Daniels et al. | 710/22 |
| 6,629,206 B1 | | 9/2003 | Johnson | |
| 6,647,502 B1 | * | 11/2003 | Ohmori | 713/322 |
| 6,961,276 B2 | | 11/2005 | Atallah et al. | |
| 2001/0011356 A1 | * | 8/2001 | Lee et al. | 713/322 |
| 2003/0191915 A1 | * | 10/2003 | Saxena et al. | 711/160 |
| 2004/0098540 A1 | | 5/2004 | Itoh et al. | |
| 2005/0289254 A1 | * | 12/2005 | Chien | 710/52 |
| 2006/0259714 A1 | * | 11/2006 | De Santis et al. | 711/154 |

* cited by examiner

*Primary Examiner*—Thomas Lee
*Assistant Examiner*—Mohammed H Rehman
(74) *Attorney, Agent, or Firm*—Joanna G. Chiu; Robert L. King

(57) ABSTRACT

A system and method saves power in a system memory of a processing system. A peripheral, a processor, an arbiter and a system memory are coupled to a system communication bus for communicating via the system communication bus. In one form a voltage controller is coupled to the system memory for varying the operating voltage of the system memory based upon whether the data processor or the peripheral is accessing the system memory. In another form a storage buffer is coupled to the memory for receiving and storing data from the memory. The buffer provides at least one signal that is used for either determining a rate at which the storage buffer is being emptied of data or a measure of fullness of the storage buffer. In one form the voltage controller varies the operating voltage of the memory based upon either the rate at which the storage buffer is being emptied of data or the measure of fullness.

9 Claims, 3 Drawing Sheets

SYSTEM HAVING A MEMORY VOLTAGE CONTROLLER WHICH VARIES AN OPERATING VOLTAGE OF A MEMORY AND METHOD THEREFOR

BACKGROUND

1. Field

This disclosure relates generally to systems, and more specifically, to a system having a memory voltage controller.

2. Related Art

In many systems, such as, for example, mobile systems, power consumption is of primary concern. For example, in mobile systems, reduction of power consumption can extend battery life. System power results from power consumed by the processor and other components, such as main memory and peripherals. Therefore, reducing power consumed by any of these components may result in reduced system power consumption.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
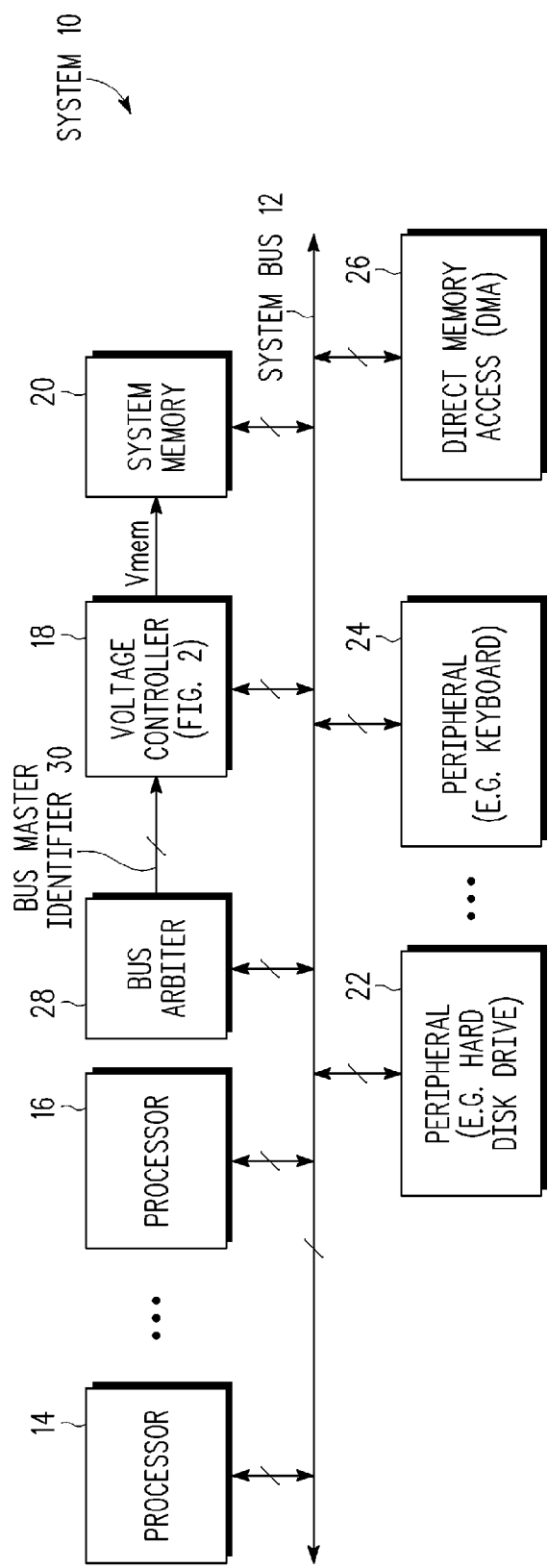
FIG. 1 illustrates, in block diagram form, a system in accordance with one embodiment of the present invention.

It is typically desirable to reduce power consumption within a system. In one embodiment, a system includes at least one processor, a system memory, and a direct memory access (DMA) which allows other peripherals (e.g. hard disk drive, keyboard, memory, etc.) to communicate with the system memory. A voltage controller within the system may adjust or vary the operating voltage of the system memory in an attempt to reduce power consumption. For example, the voltage controller may provide a first operating voltage to the system memory when a processor of the system is accessing the system memory but may provide a second operating voltage to the system memory which is lower than the first operating voltage when the DMA is accessing the system memory. The memory operating voltage can be lowered when the DMA is accessing the system memory as compared to the processor accessing the system memory since the peripherals communicating with the system memory via the DMA operate at a lower performance as compared to the processor. In another example, the voltage controller may monitor the rate at which data from the system memory is read, through the use of, for example a buffer and buffer monitor, and adjust or vary the operating voltage of the system memory accordingly.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates a system 10 including a system bus 12 and a plurality of processors, such as processors 14 and 16, a plurality of peripherals, such as peripherals 22 and 24, a bus arbiter 28, system memory 20, a DMA 26, and a voltage controller 18, all coupled to system bus 12 (also referred to as a system communication bus). Voltage controller 18 is coupled to bus arbiter 28, system memory 20, and system bus 12. Voltage controller 18 provides a memory operating voltage, Vmem, to system memory 20, and receives a bus master identifier signal 30 from bus arbiter 28. Note that system 10 may include any number of processors, or alternatively, may include only a single processor. Each of the processors can be any type of processor, such as, for example, any type of data processing system, digital signals processors (DSPs), etc. Each processor includes at least one input and at least one output coupled to system bus 12. System 10 may also include any number of peripherals, or alternatively, may include only a single peripheral. Each of the peripherals can be any type of peripheral, such as, for example, a hard disk drive, a keyboard, any type of input/output device, timers, etc. Some or all of the peripherals within system 10 may need to communicate data to or from (or both to and from) system memory 20. These peripherals may do so by communicating via system bus 12. For example, these peripherals may communicate with system memory 20 through the use of DMA 26 where DMA 26 controls the communication and data transfers between system memory 20 and these peripherals. For example, DMA 26 may direct memory accesses from these peripherals to system memory 20. Alternatively, a peripheral may communicate directly with system memory 20. In some embodiments, peripherals may be located on one or more local peripheral buses which are independent of system bus 12 and which are coupled to system bus 12 and/or DMA 26, to allow for multiple independent or simultaneous transfers on these buses to occur. However, for ease of discussion herein, it will be assumed that any peripheral which communicates with system memory 20 does so via DMA 26. System memory 20 may also be any kind of memory, such as, for example, a dynamic random access memory (DRAM), flash memory, magneto-resistive random access memory (MRAM), static random access memory (SRAM) etc. System memory 20 receives memory access requests and stores and provides data in response to the memory access requests, and operates at an operating voltage (e.g. Vmem).

Depending on the nature of the access to system memory 20, system memory 20 may operate at different operating voltages. In some embodiments, system memory 20 may be able to respond to an access request with lower latency when the memory operation voltage is higher, and may respond with longer latency, but improved power or energy consumption, when the memory voltage is lowered. For example, accesses from a processor may be more speed critical than accesses from peripherals, and therefore, the memory operating voltage, Vmem, of system memory 20 can be at a higher level for accesses from processor 14 or 16 and may be lowered for accesses from peripherals. That is, in the illustrated embodiment, when DMA 26 is accessing data from system memory 20 for the requesting peripheral, voltage controller 18 may lower the value of Vmem for the duration of that access. Therefore, in response to whether a processor (such as processor 14 or 16) or a peripheral (via DMA 26) is accessing system memory 20, voltage controller 18 outputs a higher or a lower value for Vmem, respectively, and the access completes with a latency which varies with the applied voltage during the particular transfer.

Bus arbiter 28 controls access to system bus 12, where any type of arbiter may be used. In arbitrating system bus 12, bus arbiter 28, or other arbitration logic typically identifies which bus master is requesting access to system bus 12. Upon granting access to a requesting master (which can be any of the elements coupled to system bus 12 capable of operating as a bus master, including, e.g., processor 12, processor 14, DMA 26, etc.), bus arbiter 28 provides a bus master identifier 30, which identifies the current bus master which has been granted control of system bus 12. Furthermore, voltage controller 18 may snoop addresses on system bus 12, such that when the bus master identifier 30 identifies a processor, such as processor 14 or 16, voltage controller 18 can also determine whether or not the identified processor is accessing system memory 20. For example, voltage controller 18 can determine whether the access address provided by the current bus master corresponds to an address of system memory 20. This can be done through the use of an address map which may indicate which range or ranges of access addresses correspond to system memory 20. If so, then voltage controller 18 knows that a processor is accessing system memory 20 and therefore set Vmem accordingly (to a higher value). If bus arbiter 28, via bus master identifier 30, identifies DMA 26 as the bus master who currently has control of system bus 12, then voltage controller 18 knows that it is a peripheral (e.g. peripheral 22 or 24) is accessing system memory 20 (through the use of DMA 26) and can therefore set Vmem accordingly (to a lower value). Note that in one embodiment, if DMA 26 is identified by bus master identifier 30, voltage controller 18 need not snoop addresses of system memory 20 because DMA 26 can only access system memory 20. However, in an alternate embodiment, voltage controller 18 may need to snoop system bus 12 to determine if the address being accessed by DMA 26 is within system memory 20 because DMA 26 may be able to access another memory or module coupled to system bus 12. Therefore, voltage controller 18 can vary the value of Vmem based on who is accessing system memory 20 (for example, based upon whether a processor or a peripheral is accessing system memory 20).

In another form voltage controller 18 varies the value of Vmem based on the address range of system memory 20 (in addition to or instead of varying the value of Vmem based on who is accessing system memory 20). In one embodiment, system memory 20 may be mapped to multiple overlapping or non-overlapping address ranges, and based on the particular address range accessed, the memory may be operated at one of a predetermined number of voltage levels, allowing further qualification of timing-critical accesses to be determined independently of the current bus master. In one embodiment, all or a portion of system memory 20 may be mapped to respond to a range of addresses x0 . . . xN, and y0 . . . yN, where address x0 (xN) and y0 (yN) correspond to the same physical memory location z0 (zN) in system memory 20. In such an embodiment, the processor 14, 16 or DMA 26 may dynamically determine whether a particular access is timing critical and may utilize a predetermined portion of system memory 20, or may reference one of multiple overlapping addresses such as x0, or alternatively y0 corresponding to the same single physical memory location z0 in system memory 20 to selectively complete the access with either lower latency or lower power as desired.

In one embodiment, the lower value of Vmem described above (when a peripheral is accessing system memory 20 via DMA 26) is approximately 20% lower than the higher value of Vmem (when a processor of system 12 is accessing system memory 20). Alternatively, the lower value of Vmem is at least 15% or 20% lower than the higher value of Vmem. Note that the lower value of Vmem permits system memory 20 to continue operating at a slower speed of operation than when the higher value of Vmem is used. In one embodiment, Vmem is lowered for peripheral accesses to system memory 20 via DMA 26 to the lowest voltage which still allows for proper operation of system memory 20.

Note that the information provided by bus master identifier 30 may also be provided by other elements in system 10, such as by the current bus master itself. For example, each bus master may have an associated bus master identification value that is provided with each access to system bus 12, where voltage controller 18 may then use this bus master identification value to determine who the current bus master is. Alternatively, voltage controller 18 may use different methods and logic to determine who is accessing system memory 20, or may use the particular location or overlapped mapping of an access within system memory 20 to complete the access.

Figure 2:
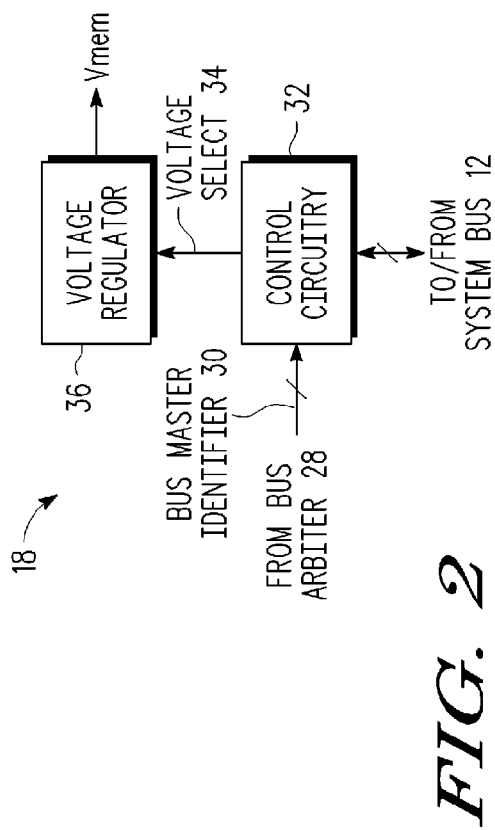
FIG. 2 illustrates, in block diagram form, one embodiment of the voltage controller of FIG. 1.

FIG. 2 illustrates one embodiment of voltage controller 18 having a voltage regulator 36 and control circuitry 32 coupled to voltage regulator 36. Control circuitry receives bus master identifier 30 from bus arbiter 28 and is also coupled to system bus 12 to be able to snoop access addresses, as discussed above. Therefore, based on bus master identifier 30, and the access address snooped from system bus 12, if needed, control circuitry 32 provides a voltage select signal 34 to voltage regulator 36. In one embodiment, voltage select 34 is a digital signal which is used by voltage regulator 36 to select one of a plurality of voltage values for Vmem. Voltage regulator 36, in response to voltage select 34, outputs one of a plurality of values for Vmem, depending on which bus master is accessing system bus 12, as described above. For example, in one embodiment, if control circuitry 32 determines (based on bus master identifier 30 and the access address snooped or monitored from system bus 12) that a processor of system 10, such as one of processor 14 or 16, is accessing system memory 20, control circuitry 32 can assert voltage select 34 to a logic level one to indicate that the higher Vmem value should be output by voltage regulator 36. However, if control circuitry 32 determines (based on bus master identifier 30) that a peripheral (via DMA 26) is accessing system memory 20, control circuitry 32 can negate voltage select 34 to a logic level zero to indicate that the lower Vmem value should be output by voltage regulator 36.

Voltage regulator 36 is therefore capable of providing either the higher or lower value of Vmem in response to voltage select 34. However, note that voltage regulator 36 may also be able to provide other values of Vmem based on other criteria. Also, in the embodiment discussed above, voltage select 34 selects one of two different Vmem values (a higher Vmem and a lower Vmem). Alternatively, voltage select 34 can be a multi-bit signal which identifies one of a plurality of values for Vmem (e.g., more than 2 values) based on different masters accessing system memory 20. For example, in one embodiment, a different value of Vmem may be used based on which processor within system 10 is accessing system memory 20 (e.g. based on whether processor 14 or processor 16 is accessing system memory 20). In this embodiment, a higher value of Vmem may be used for processor 14 than for processor 16 because, for example, processor 14 may be a faster processor. (Note that any known voltage regulator circuitry may be used to implement voltage regulator 36.)

Figure 3:
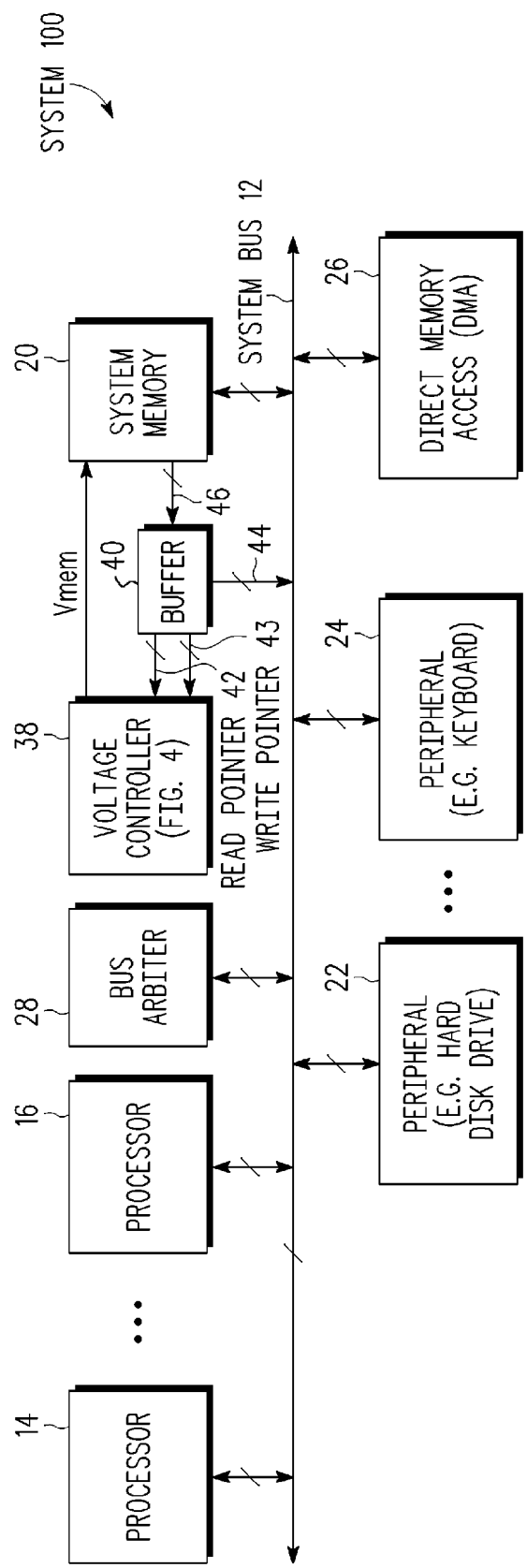
FIG. 3 illustrates, in block diagram form, a system in accordance with one embodiment of the present invention.

FIG. 3 illustrates a system 100 in which the operating voltage, Vmem, of system memory 20 may be adjusted or varied based on the rate at which data is being consumed or read from system memory 20. System 100 is similar to system 10, in which like reference numbers are used to indicate like elements. Therefore, the descriptions provided above with respect to these like elements also apply to system 100. However, system 100 includes a voltage controller 38 rather than voltage controller 18, and further includes a buffer 40 (also referred to as a storage buffer). Voltage controller 38 provides Vmem to system memory 20. Buffer 40 receives read data from system memory 20, provides read data to system bus 12, and provides a read pointer value 42 and a write pointer value 43 to voltage controller 38. In an alternate embodiment, one of the read or write pointers may be a fixed value, corresponding to, for example, the head of a queue of buffer entries.

When a consumer within system 100 consumes data from system memory 20 (i.e. reads data from system memory 20), the read data is transferred via buffer 40, such that the read data is transferred into buffer 40 from system memory 20 via conductors 46 and buffer 40 then transfers the read data out to system bus 12 via conductors 44 so that it can be provided to the consuming (i.e. requesting) entity (which may be, for example, any of the processors, peripherals, or DMA of system 100). Buffer 40 advances a write pointer as read data is transferred into buffer 40 and advances the read pointer as read data is transferred out of buffer 40 to system bus 12. Voltage controller 38 may therefore monitor the rate of data consumption from buffer 40 to determine how to adjust Vmem. For example, Vmem can be lowered if buffer 40 is being emptied slowly while a higher value of Vmem can be used if buffer 40 is being emptied quickly. In one embodiment, buffer 40 outputs at least one signal that indicates a rate at which the storage buffer is being emptied of data. This at least one signal may include, for example, the values of read pointer 42 and write pointer 43, as will be discussed in more detail below.

Figure 4:
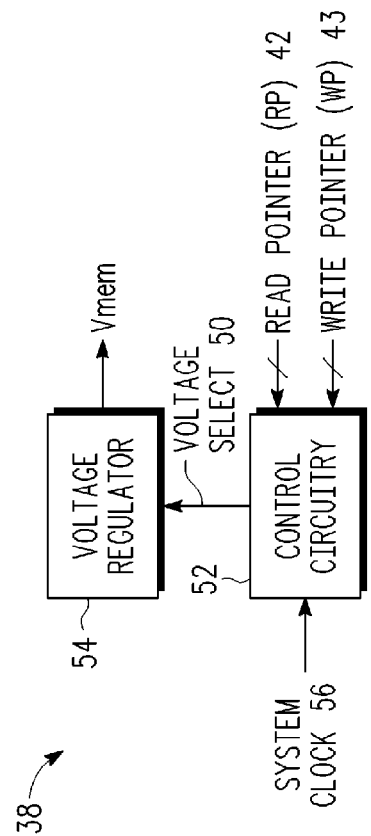
FIG. 4 illustrates, in block diagram form, one embodiment of the voltage controller of FIG. 3.

FIG. 4 illustrates one embodiment of voltage controller 38 having control circuitry 52 and a voltage regulator 54. Voltage regulator 54 provides the value of Vmem in response to a voltage select signal 50. That is, similar to voltage regulator 36, voltage regulator 54 is capable of providing one of a plurality of values for Vmem. In one embodiment, voltage select 50 is a single bit digital signal which, when asserted, indicates that a higher value of Vmem is to be provided by voltage regulator 54 and when negated, indicates that a lower value of Vmem is to be provided by voltage regulator 54. (Note that the discussions provided above with respect to differences between the values of the higher Vmem and lower Vmem apply here as well.) In one embodiment, the higher value of Vmem is indicated by voltage select 50 when the data in buffer 40 is being transferred quickly (greater than a particular threshold) to system bus 12 and the lower value of Vmem is indicated by voltage select 34 when the data in buffer 40 is being transferred slowly (less than a particular threshold) to system bus 12. Determination of the value of voltage select 50 in accordance with one embodiment, will be described in more detail with respect to the state transition diagram of FIG. 5.

Voltage regulator 54 is therefore capable of providing either the higher or lower value of Vmem in response to voltage select 50. However, note that voltage regulator 54 may also be able to provide other values of Vmem based on other criteria. Also, in the embodiment discussed above, voltage select 50 selects one of two different Vmem values (a higher Vmem and a lower Vmem). Alternatively, voltage select 50 can be a multi-bit signal which identifies one of a plurality of values for Vmem (e.g., more than 2 values) based on different data transfer thresholds. For example, an intermediate value of Vmem may be used if the data transfer rate out of buffer 40 is within a particular range of thresholds.

Control circuitry 52, in one embodiment, receives a system clock 56 and receives read pointer (RP) 42 and write pointer (WP) 43 from buffer 40. Note that system clock 56 can be provided by system clock circuitry within system 100, as known in the art. Control circuitry 52, through the use of RP 42 and WP 43, can determine the rate of data transfer from buffer 40 to system bus 12 (or the relative fullness of buffer 40), and set voltage select 50 accordingly. In one embodiment, only a single pointer value may be used (e.g., WP 43) where the other pointer (e.g., RP 42) may be set to a predetermined location. Alternate embodiments may use other methods for determining capacity utilization of the buffer and the rate of transfer through the buffer, and may utilize such determinations to indicate the relative fullness of buffer 40 and set voltage select 50.

Figure 5:
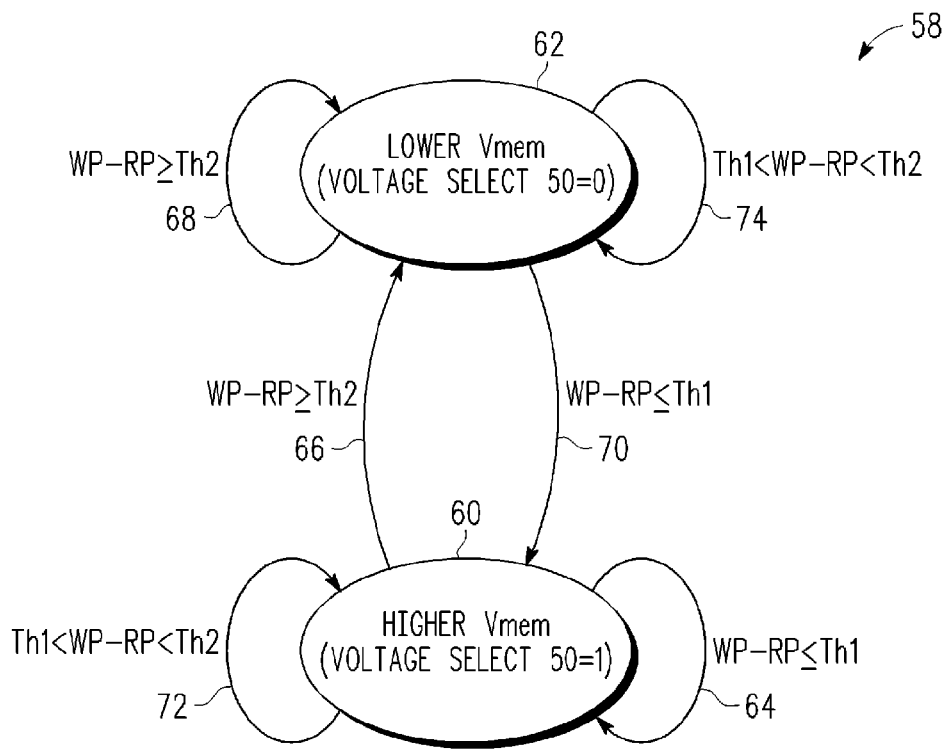
FIG. 5 illustrates a state transition diagram implemented by the voltage controller of FIG. 3, in accordance with one embodiment of the present invention.

FIG. 5 illustrates one embodiment of a state transition diagram 58 which may be implemented by control circuitry 52 to monitor the data transfer rate from buffer 40. State transition diagram 58 includes a first state 60 (corresponding to the higher Vmem, where voltage select 50 is set to a one or logic level high) and a second state 62 (corresponding to the lower Vmem, where voltage select 50 is set to a zero or logic level low). In one embodiment, upon power up, control circuitry 52 begins in state 60 where voltage select 50 is set to one. In this manner, voltage regulator 54 provides the higher value of Vmem to system memory 20. Control circuitry 52 then monitors the values of RP 42 and WP 43 to determine when to transition states (and thus transition to the lower Vmem). In one embodiment, at every clock cycle of system clock 56, the value of "WP-RP" is calculated and compared to various thresholds (such as a first threshold, Th1, and a second threshold, Th2) to determine the next state to be transitioned to in the next clock cycle.

In the illustrated embodiment, state transition diagram 58 operates such that the higher Vmem remains selected so long as the value of "WP-RP" remains less than or equal to the first threshold and the lower Vmem remains selected so long as the value of "WP-RP" remains greater than or equal to the second threshold. Note that the first threshold differs from the second threshold, where the two different thresholds are used to ensure that the value of Vmem is not varied too often since there may be disadvantages in performance or power consumption as a consequence of changing Vmem too often. Alternatively, the first and second thresholds may be substantially the same.

Starting in state 60, the value of "WP-RP" is calculated and compared with the thresholds. If the value is less than or equal to Th1, the next state is state 60, as indicated by transition 64, thus the higher value of Vmem remains selected. However, if the value of WP-RP is greater than or equal to Th2, the next state is 62, as indicated by transition 66. Therefore, upon the next clock, control circuitry 52 begins transitioning to state 62 where the lower value of Vmem will be selected. Once in state 62, if the value of "WP-RP" remains greater than or equal to Th2, the next state remains state 62, as indicated by transition 68, and therefore, the lower Vmem remains selected. Once the value of "WP-RP" drops to less than or equal to Th1, control circuitry 52 transitions back to state 60 via transition 70 where again, the higher value of Vmem is selected.

Note that once in state 60, even if the value of "WP-RP" increases to a value greater than Th1, control circuitry 52 remains in state 60 (as indicated by transition 72) until the value increases up to a value greater than or equal to Th2. Similarly, once in state 62, even if the value of "WP-RP" decreases to a value less than Th2, control circuitry remains in state 62 (as indicated by transition 74) until the value decreases down to a value less than or equal to Th1. In this manner, even if the value of "WP-RP" rises above or below thresholds Th1 or Th2, a transition to a different state does not immediately occur. In this manner, the value of Vmem is not varied every time the threshold is surpassed by a single count. For example, in one embodiment, Th1 is 10 and Th2 is 20. In this example, starting in state 60, the higher value of Vmem remains selected until "WP-RP" surpasses 20 (Th2). Therefore, if the value of "WP-RP" starts at 0 and begins to increase each clock as read data is transferred into buffer 40, state 60 will not transition to state 62 until the value of "WP-RP" is greater than or equal to 20. In this manner, if the value of WP-RP hovers around 10 (Th1), control circuitry 52 will not continuously transition between states 60 and 62.

Therefore, by monitoring the difference between WP and RP, a determination can be made as to how full buffer 40 is, and the rate at which data is being transferred out of buffer 40. For example, if the amount of read data in buffer 40 continuously increases or remains high (e.g. at or above Th2), then the data is being transferred to system bus 12 (e.g. consumed) slowly, thus allowing for the lower Vmem to be used. Likewise, if the amount of read data in buffer 40 continuously decreases or remains low (e.g. at or below Th1), then the data is being transferred to system bus 12 (e.g. consumed) quickly, where the higher Vmem may be used. Therefore, the value of Vmem can be varied accordingly. Therefore, voltage controller 38 may maintain or place Vmem at the lower value when buffer 40 empties data slowly (e.g. at or below a second predetermined rate) and may maintain or place Vmem at the higher value when the buffer 40 empties data quickly (e.g. at or above a first predetermined rate), where the first and second predetermined rates can be different or substantially equal.

In one embodiment, the determination of the values of transition thresholds Th1 and Th2 is determined by at least two factors. First, frequent transitions between the low Vmem state and the high Vmem state can expend more power in the memory than is actually saved. Therefore, the thresholds are chosen such that the benefit of power savings in the memory is maintained. Second, there is a finite time required for transitioning the voltage supply of the memory from the low Vmem state to the high Vmem state. This transition delay is a function of the voltage regulator performance coupled with capacitance of the memory power grid. Hence, this transition delay is considered when choosing the values of transition thresholds Th1 and Th2. For example, adequate time for transitioning the memory power grid needs to be allowed such that the memory is able to provide higher performance to fulfill its obligations to a consumer that has begun to increase its demand on buffer 40.

Also, in alternate embodiments, any number of thresholds may be used depending on how many states are desired (which depends on how many different values of Vmem are to be implemented), and any method for determining the values of these thresholds may be used. Alternatively, other methods of monitoring the rate of transferring data out of buffer 40 or the relative fullness of buffer 40 may be used, where other control or rate information, other than or in addition to RP 42 and WP 43, can be provided to control circuitry 52 (indicative of the rate of data transfer out of buffer 40 or the relative fullness of buffer 40), where control circuitry 52 can then process this information using any appropriate logic to set voltage select 50. For example, in an alternate embodiment, RP 42 is continually sampled over a predetermined number of clock cycles. The sampling of RP 42 would determine the number of times N that RP 42 transitioned to a new value over the predetermined number of cycles. The control circuitry 52 would then compare N to predetermined thresholds in a manner that appropriately controlled the value of voltage select 50. The choice of thresholds would be governed by similar considerations as described above. In another alternate embodiment, the transition rate of data provided by conductor 44, which couples buffer 40 to system bus 12, is sampled. For example, the number of times D that the data conductor 44 transitioned to a new value over a predetermined number of clock cycles is determined in this manner. The control circuitry 52 would then compare D to predetermined thresholds in a manner that appropriately controlled the value of voltage select 50.

In yet another embodiment, buffer 40 is implemented as a memory array that uses dual-port bitcells with separate read and write ports. The read access would be controlled by a read_enable signal such that an asserted read_enable signal results in a read access while a deasserted read_enable signal results in the array remaining unaccessed. The precise entry being read is determined by read address inputs. Sampling the read_enable signal over a predetermined number of clock cycles is then indicative of the read activity of buffer 40. The results of this sampling can thus be used to control the value of voltage select 50 in a manner similar to the previously described embodiments associated with FIG. 4.

Figure 6:
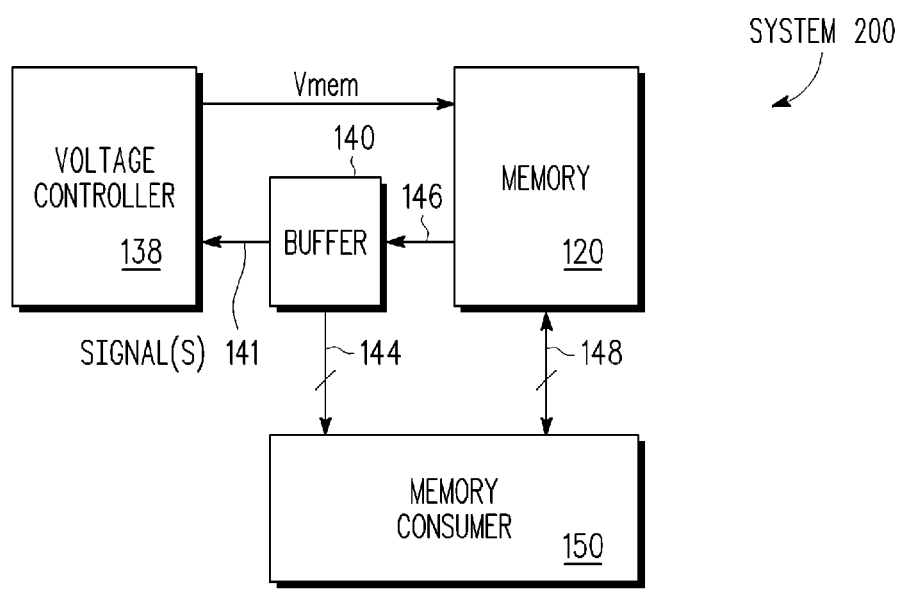
FIG. 6 illustrates, in block diagram form, a system in accordance with one embodiment of the present invention.

FIG. 6 illustrates a system 200 in accordance with one embodiment of the present invention. System 200 is a more generic version of system 100, and includes a voltage controller 138, a buffer 140, a memory 120, and a memory consumer 150. Voltage Buffer 140 receives read data from memory 120 and provides this read data to memory consumer 150, and provides signal(s) 141 to voltage controller 138. Voltage controller 138 provides Vmem to memory 120. Voltage regulator 138 and buffer 140 operate analogous to voltage regulator 38 and buffer 40, where voltage regulator 138 provides the value of Vmem based on the rate of transfer of read data from buffer 140 to memory consumer 150 or the relative fullness of buffer 140 based on signal(s) 141. In one form signal(s) 141 include one or more signals provided from buffer 140 which may be used to determine the rate of transfer of read data from buffer 140 or the relative fullness of buffer 140. For example, as discussed above in reference to read pointer 42, write pointer 43, and state transition diagram 58, signal(s) 141 may include the read pointer of buffer 140, the write pointer of buffer 140, or both. Alternatively, signal(s) 141 may include another signal or signals as needed by voltage controller to vary the value of Vmem appropriately.

Note that memory consumer 150 can be any circuitry which reads data from memory 120 via buffer 140. The read data is provided from memory 120 to buffer 140 via conductors 146, and buffer 140 provides this read data to memory consumer 150 via conductors 144 at a rate manageable by memory consumer 150. Memory consumer 150 can also communicate directly, if needed, with memory 120 via conductors 148. For example, control signals and access addresses can be communicated via conductors 148. Also, memory consumer 150 may have the ability to write data to memory 120, in which case write data could also be provided via conductors 148.

In one embodiment, system 200 is a portion of a processor, where memory consumer 150 may be a memory within the processor or may be other circuitry within the processor. In one embodiment, memory consumer 150 includes all or a portion of an instruction prefetch queue within a processor. In another embodiment, memory consumer 150 includes all or a portion of a data stack memory within a processor. Alternatively, one or more of voltage controller 138, buffer 140, and memory 120 may be located external to memory consumer 150. Alternatively, system 200 may be a larger system where memory 120 is an external system memory located separately from memory consumer 150. Also, note that memory consumer 150 may communicate directly to buffer 140 and memory 120, or may communicate to buffer 140 and memory 120 via a communication bus.

Any of systems 10, 100, and 200 can be implemented on one or more integrated circuits. Also, note that the voltage controllers described in reference to FIGS. 1, 3, and 6 can be located anywhere within the system or may be distributed into different parts of the system. Also, in one embodiment, part of the circuits or logic described herein, such as, for example, the voltage regulators or the buffers, can be located within the memory whose operating voltage is being controlled.

By now it should be appreciated that there has been provided various systems in which the operating voltage to a memory can be adjusted or varied based on various criteria. For example, in one embodiment, the operating voltage of the memory is raised or lowered based on who is accessing the memory. In another embodiment, the operating voltage of the memory is raised or lowered based on the rate of data consumption from a buffer that receives the read data from the memory. In this manner, by varying the value of the memory operating voltage, such as by lowering the voltage when slower performance is acceptable, power consumption may be reduced.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1-4 and 6 and the discussion thereof describe exemplary information processing architectures, these exemplary architectures are presented merely to provide a useful reference in discussing various aspects of the invention. Of course, the description of these architectures has been simplified for purposes of discussion, and they are just a few of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In one embodiment, the illustrated elements of systems 10, 100, and 200 are circuitry located on a single integrated circuit or within a same device. Alternatively, each system may include any number of separate integrated circuits or separate devices interconnected with each other. Also for example, each of the systems or portions thereof may be soft or code representations of physical circuitry or of logical representations convertible into physical circuitry. As such, each of system 10, 100, and 200 or portions thereof may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, each of systems 10, 100, and 200 may be a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, different methods of monitoring the rate of data transfer from the buffers may be used, or more than two values of Vmem may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system comprising:
a system communication bus;
a data processor having at least one input and at least one output coupled to the system communication bus for communicating via the system communication bus;
a peripheral coupled to the system communication bus for communicating via the system communication bus;
a system memory coupled to the system communication bus for receiving memory access requests and storing and providing data in response to the memory access requests, the system memory operating at an operating voltage;
a voltage controller coupled to the system memory for varying the operating voltage of the system memory based upon whether the data processor or the peripheral is accessing the system memory, wherein the operating voltage is dependent upon the system memory being accessed by the processor or being accessed by the peripheral such that when the data processor is accessing the system memory, the operating voltage has a first value and when the peripheral is accessing the system memory, the operating voltage has a second value, different from the first value.

2. The system of claim 1 wherein the voltage controller lowers the operating voltage of the system memory from the first value used when the data processor is accessing the system memory to the second value when the peripheral is accessing the system memory, the second value permitting the system memory to continue operating but at a slower speed of operation than when the first value of the operating voltage is used.

3. The system of claim 1 wherein the system further comprises:
a direct memory access device coupled to the system communication bus for directing memory accesses from the peripheral to the system memory, wherein the voltage controller reduces the operating voltage of the system memory when the direct memory access requests an access to the system memory for the peripheral.

4. The system of claim 1 wherein the voltage controller further comprises:
a control circuit having first and second inputs coupled to the system communication bus for respectively receiving a bus master identifier that identifies who has bus mastership and for receiving an access address, the control circuit having an output for providing a voltage select signal based upon at least one selected from a group consisting of the bus master identifier and the access address; and
a voltage regulator having an input coupled to the output of the control circuit, the voltage regulator having an output for providing the operating voltage of the system memory.

5. The system of claim 4 further comprising:
a system bus arbiter coupled to the communication bus and having an output for providing the bus master identifier to the control circuit.

6. A method comprising:
providing a system communication bus;
coupling a data processor having at least one input and at least one output to the system communication bus for communicating via the system communication bus;
coupling a peripheral to the system communication bus for communicating via the system communication bus;
coupling a system memory to the system communication bus for receiving memory access requests and storing and providing data in response to the memory access requests, the system memory operating at an operating voltage; and
coupling a voltage controller to the system memory for varying the operating voltage of the system memory based upon whether the data processor or the peripheral is accessing the system memory, wherein the operating voltage is dependent upon the system memory being accessed by the processor or being accessed by the peripheral such that when the data processor is accessing the system memory, the operating voltage has a first value and when the peripheral is accessing the system memory, the operating voltage has a second value, different from the first value.

7. The method of claim 6 further comprising lowering the operating voltage of the system memory from the first value when the data processor is accessing the system memory to the second value when the peripheral is accessing the system memory, the second value permitting the system memory to continue operating but at a slower speed of operation than when the first value of the operating voltage is used.

8. The method of claim 6 further comprising:
coupling a direct memory access to the system communication bus for directing memory accesses from the peripheral to the system memory; and
reducing the operating voltage of the system memory when the direct memory access requests an access to the system memory for the peripheral.

9. The method of claim 6 further comprising:
coupling a control circuit having first and second inputs to the system communication bus for respectively receiving a bus master identifier that identifies who has bus mastership and for receiving an access address;
providing the control circuit with an output for providing a voltage select signal based upon the bus master identifier and the access address; and
coupling an input of a voltage regulator to the output of the control circuit, the voltage regulator having an output for providing the operating voltage of the system memory.

* * * * *